(No Model.) 2 Sheets—Sheet 2.

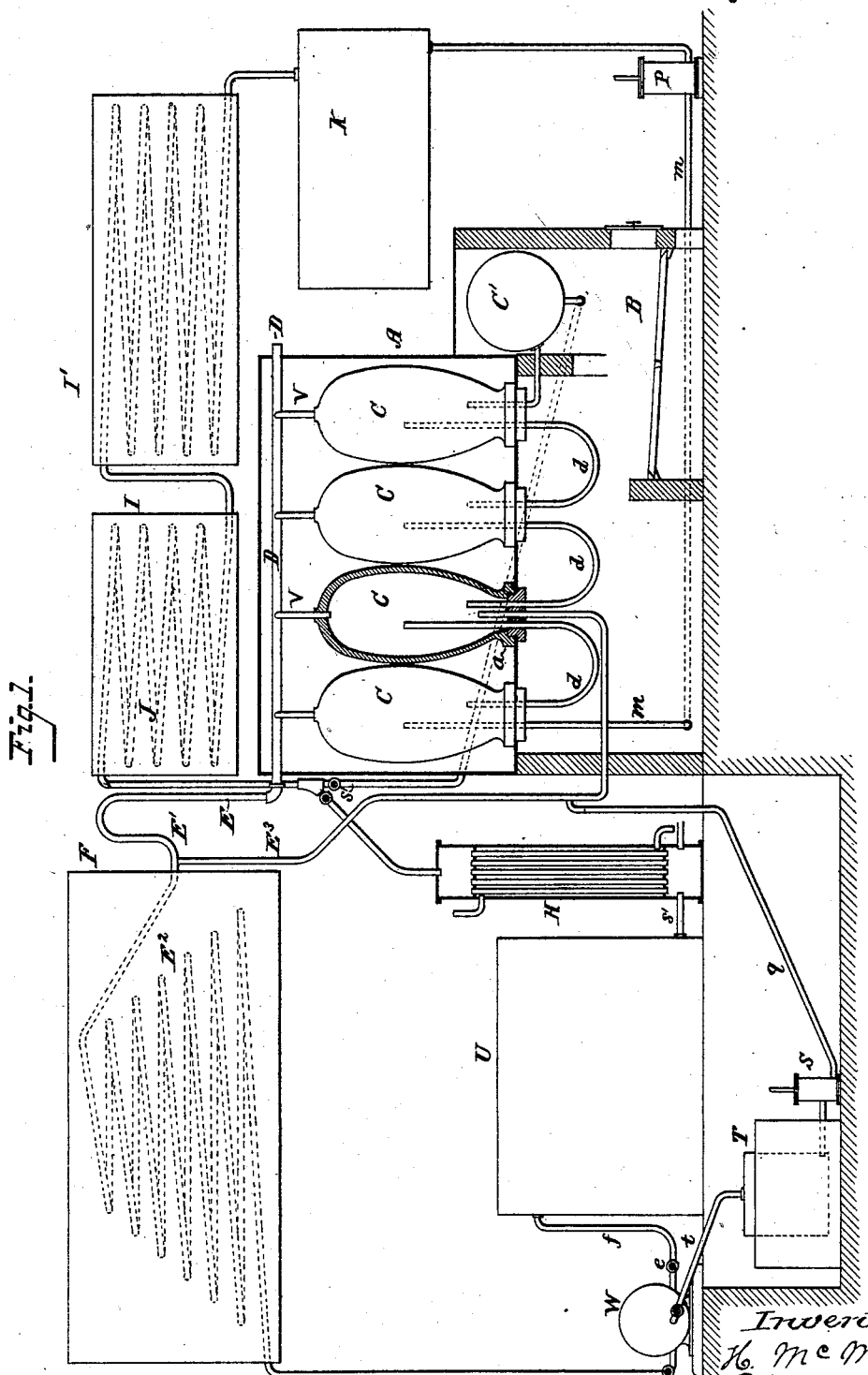

H. & R. McMANUS.
AMMONIA ICE MACHINE AND REFRIGERATING APPARATUS.

No. 282,101. Patented July 31, 1883.

Attest:
Courtney A. Cooper.
Josephine Campbell.

Inventors.
H. McManus
R. McManus
By their Attorney
Charles E. Foster

UNITED STATES PATENT OFFICE.

HENRY McMANUS AND ROBERT McMANUS, OF NEW YORK, N. Y., ASSIGNORS TO SAID HENRY McMANUS, TRUSTEE.

AMMONIA ICE-MACHINE AND REFRIGERATING APPARATUS.

SPECIFICATION forming part of Letters Patent No. 282,101, dated July 31, 1883.

Application filed March 7, 1882. (No model.)

*To all whom it may concern:*

Be it known that we, HENRY McMANUS and ROBERT McMANUS, residents of the city, county, and State of New York, have invented Improvements in Ammonia Ice-Machines and Refrigerating Apparatus, of which the following is a specification.

Our invention relates to that class of refrigerating-machines in which the cooling effect is produced by first vaporizing by heat the ammonia contained in ammonia-water, cooling and condensing the gas, and then permitting the same to expand in contact with the surface to be cooled; and our invention consists in means whereby we secure the volatilization of the ammonia without evaporating the water, and in such a construction of the apparatus as will reduce its cost and the liability of leakage.

Figure 3:
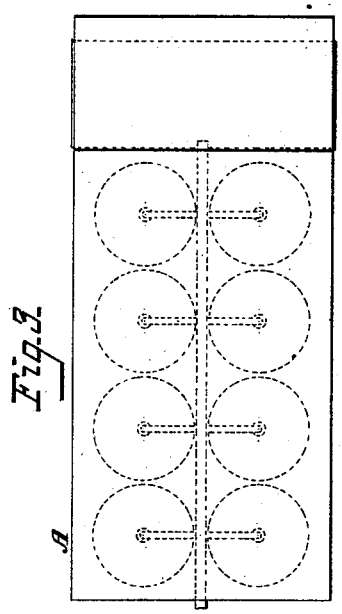
Figure 2:
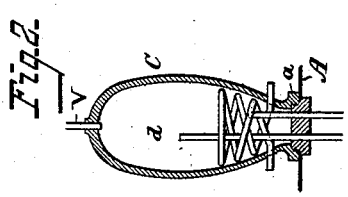

In the drawings, Figure 1 is a sectional elevation, showing one form in which our refrigerating apparatus may be embodied. Fig. 2 is a sectional view of one of the evaporating-vessels, showing a modification; and Fig. 3 is a plan view, showing the arrangement of the liquor-receptacles.

The usual mode of heating a refrigerating-liquid in aqua-ammonia machines is to apply the heat directly to the vessel (generally of a tubular form) containing the liquid. By this means it is impossible to maintain a uniform heat. It sometimes becomes too low, reducing the working effect of the machine, or too high, in which case the water as well as the ammonia is vaporized, and both pass together to the condensing and refrigerating coils, reducing the strength of the liquid, and by absorbing the gas preventing any refrigerating effect. To avoid this difficulty we immerse the receptacles into which the strong liquor is passed in a body of water, oil, glycerine, or any suitable solution, and apply the heat to this surrounding liquid, which may be under pressure or not, and can be readily maintained at the exact temperature requisite to volatilize the ammonia without vaporizing the water, thereby preventing the passage of water-vapor to the gas-pipes, and securing a most effective result.

Different forms of apparatus may be employed in carrying out our invention. That shown in the drawings consists of a tank, A, to receive the heating water or solution, a furnace, B, arranged below the same, and receptacles C, connected with each other by curved pipes $d$, as shown, and by straight pipes V with the take-off main D, and arranged within the tank A so as to be surrounded and covered by the heating-fluid. These receptacles C may be pipes or cases; but I prefer to use hollow vessels of cast-iron, preferably egg-shaped, and with hollow nipples $a$, and into caps adapted to the nipples extend the connected pipes $d$, as shown. By constructing the vessels in this manner, each of one single piece of metal, we reduce the number of joints to a minimum, and thereby reduce the danger of leakage, so apt to occur in this class of machines.

The gas-main D communicates through a pipe, E, having a trap, E', with a serpentine coil, $E^2$, in a tank, F, through which water constantly flows; and, if necessary, the pipe may be extended in the form of a second coil through another water-tank. From the trap E' a pipe, $E^3$, leads back to one of the vessels C, so that any liquor carried into the pipe E will be drained back and not go forward to the coil $E^2$. The gas, while under pressure resulting from the heat and expansion of the ammonia, is cooled by its passage through the coils, and is condensed and flows as a liquid into receptacle W, provided with an outlet-pipe, $f$, closed by a cock, $e$. The pipe $f$ communicates with the serpentine coil which extends through the refrigerating-vat or chamber U, or with any other well-known apparatus in which the heat is extracted from any substance by the expansion of the liquid flowing through the pipe $f$ from the receptacle W. After the gas has done its work it passes by a pipe, $s$, through a cold-water tank or condenser, H, by which it is cooled, and thence to a pipe, $s'$, leading from the last of the vessels C, or from a boiler, C', and continued in the form of a coil, J, through an absorbing-tank, I, and, if necessary, through a second tank, I', to a vessel, K, and then to a pump, P, by which the liquid is forced through a pipe, $m$, into the first of the series of receptacles C. The strong liquor admitted to the first of the vessels C is heated and the gas partly expelled, and it then flows successively through all the vessels, with a loss of a portion of the gas in each until it reaches the last. It may then pass as a very weak liquor into the boiler C', exposed directly to the fire, whereby the remaining gas is expelled, the weak liquor passing thence through the pipe s' by its own pressure to the coil J, as before described. As the gas from the cooler H is brought in contact with the liquid in the pipe s' and is carried therewith through the coil J, the gas is absorbed by the liquid, producing the strong aqua-ammonia solution which flows to the tank K, and with which the above-described operations are repeated.

By the use of the series of connected receptacles C the danger of explosion is reduced to a minimum, inasmuch as a single receptacle only is liable to rupture at one time, with a much less destructive effect than could possibly result if the entire body of fluid were in one receptacle. The pipes in the coil $E^2$ increase gradually in length from the top downward, so that the gas will travel quickly through the warmer water at the top of the tank, but more slowly as it approaches the colder body of water at the bottom.

The liquid in the tank A may be heated by steam-pipes or in any other desirable manner, and a coil of steam-pipe may be passed through one or more of the vessels C, as shown in Fig. 2, when it is desirable to secure a higher temperature.

Various different means may be adopted for cooling the liquid and gases, and the parts of the apparatus may be arranged in different relative positions. We therefore do not limit ourselves to those shown and described.

If any portion of the gas or liquor received into the tank W should prove to be weak, it is very undesirable to pass it into the refrigerating-pipes. We therefore connect the tank by a pipe, t, with a cooling-coil or condenser, T, from which a pipe leads to a pump, S, whereby the poor material may be pumped back through a pipe, q, into the pipe m or $E^2$.

Our invention must be distinguished from that class of apparatus in which a heating-tank is surrounded by a larger vessel containing the ammonia. This avoids overheating to a certain extent, but is objectionable from the exposure of the ammonia-tank to the atmosphere, which cools and condenses the ammonia, rendering re-evaporation necessary, and interfering with the regularity of the operations.

We claim—

1. The combination, in a refrigerating-machine, of receptacles for the ammonia-liquor, a tank inclosing the same and filled with a heating-liquid surrounding said receptacles, and means for heating the said liquid, substantially as set forth.

2. The combination, in a refrigerating-machine, of a series of receptacles, C, each cast in one piece, connected and arranged within a tank containing a heating-fluid, substantially as specified.

3. The combination, with the gas-pipe, of the cooling-coil E', having the pipes gradually increasing in capacity toward the bottom, substantially as and for the purpose set forth.

4. The combination, with the gas-pipe leading from the evaporating-vessels C, of a trap, E', formed in said pipe and arranged between the evaporator and condensing-coil, and return-pipe $E^3$, leading from the trap back to the evaporating-vessel, for the purpose set forth.

5. The combination, with the tank W, for receiving the liquefied gas, of a pipe, t, condenser, pump, and pipe leading to the evaporating apparatus, for the purpose specified.

6. The combination, with the evaporating-vessels arranged in a tank containing liquid, of a vessel, C', communicating with the evaporating-vessels and exposed directly to the fire, substantially as set forth.

7. The combination of the receptacles C, the inverted siphons connecting said receptacles, the outer tank inclosing both receptacles and connections and filled with water, and a furnace arranged to heat the surrounding liquid, substantially as set forth.

In testimony whereof we have signed our names to this specification in the presence of two subscribing witnesses.

HENRY McMANUS.
ROBERT McMANUS.

Witnesses:
I. H. BUDD,
WM. W. NORTHROP.